(12) United States Patent
Jacob et al.

(10) Patent No.: US 7,890,523 B2
(45) Date of Patent: Feb. 15, 2011

(54) SEARCH-BASED FILTERING FOR PROPERTY GRIDS

(75) Inventors: Kurt B. Jacob, Redmond, WA (US); Peter W. Blois, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 11/770,719

(22) Filed: Jun. 28, 2007

(65) Prior Publication Data

US 2009/0006367 A1 Jan. 1, 2009

(51) Int. Cl.
G06F 7/00 (2006.01)
G06F 17/30 (2006.01)
(52) U.S. Cl. .................. 707/759; 707/771; 707/779
(58) Field of Classification Search .............. 707/3, 707/769, 771, 779
See application file for complete search history.

(56) References Cited

U.S. PATENT DOCUMENTS

| | | | | |
|---|---|---|---|---|
| 5,832,459 | A * | 11/1998 | Cameron et al. ............... 705/26 |
| 6,043,817 | A * | 3/2000 | Bolnick et al. .............. 715/788 |
| 6,215,489 | B1 | 4/2001 | Kaplan |
| 7,526,425 | B2 * | 4/2009 | Marchisio et al. .............. 704/9 |
| 2002/0019974 | A1 * | 2/2002 | Iizuka ........................ 717/107 |
| 2003/0001892 | A1 * | 1/2003 | Hartel et al. ................. 345/762 |
| 2005/0015405 | A1 * | 1/2005 | Plastina et al. ........... 707/104.1 |
| 2005/0256834 | A1 | 11/2005 | Millington et al. |
| 2005/0289099 | A1 * | 12/2005 | Gromyko ........................ 707/1 |
| 2006/0074732 | A1 | 4/2006 | Shukla et al. |
| 2006/0075352 | A1 | 4/2006 | Burke et al. |
| 2006/0150148 | A1 | 7/2006 | Beckett et al. |
| 2006/0150172 | A1 | 7/2006 | Heath et al. |
| 2006/0200466 | A1 * | 9/2006 | Kaasten et al. ................. 707/7 |
| 2006/0221372 | A1 * | 10/2006 | Onishi et al. ................ 358/1.13 |
| 2006/0224607 | A1 | 10/2006 | Tchaitchian et al. |
| 2006/0271441 | A1 * | 11/2006 | Mueller et al. ................. 705/14 |
| 2007/0011183 | A1 * | 1/2007 | Langseth et al. ............ 707/101 |
| 2007/0011192 | A1 * | 1/2007 | Barton .................... 707/103 R |
| 2007/0038610 | A1 * | 2/2007 | Omoigui ........................ 707/3 |
| 2007/0055680 | A1 * | 3/2007 | Statchuk ..................... 707/100 |
| 2007/0088672 | A1 * | 4/2007 | Kaasten et al. .................. 707/1 |

OTHER PUBLICATIONS

"EBX. Platform Documentation", Copyright © Orchestra Networks 2000-2007, retrieved form the Internet on May 1, 2007.
"Core API Documentation: Package com.arsdigita.search.ui.filters", Copyright © 2004 Red Hat, Inc., Generated at Apr. 1, 2004, retrieved from the Internet on May 1, 2007.
Codejock Software "Explore Codejock Components", retrieved from the Internet on May 1, 2007.

* cited by examiner

*Primary Examiner*—John E Breene
*Assistant Examiner*—Mark E Hershley
(74) *Attorney, Agent, or Firm*—L. Alan Collins; Collins & Collins Incorporated

(57) ABSTRACT

Technologies for search-based filtering of a property grid. Such filtering allows a user to enter a search term into an easily recognized search text box, or apply a user or pre-defined term to a property grid, thus reducing the set of properties visible so that the user has a smaller list to search to find the one on which they desire to operate. The search term is typically applied to all properties shown in the property grid. Elements that match the search term are made visible in an updated property grid while those that do not match are not presented. Also, the search term may be applied to more than just the name of the property. It may be applied to a category within which the property appears, the type of the property, or any of a number of attributes or tags that may be applied to the property.

12 Claims, 5 Drawing Sheets

SEARCH-BASED FILTERING FOR PROPERTY GRIDS

BACKGROUND

It is common for user interface design and development tools to make use of a "property grid" to provide a user one place to look for the properties of selected objects. Via such a property grid the user can inspect the values of properties and edit properties as appropriate. While such a property grid allows the user to easily discover where a property can be edited, there are often so many properties that the user must spend time finding the particular property that he wants to inspect or edit.

Some property grids attempt to mitigate this problem by providing two views of the property grid: a first view that is categorized such that, if the user can find the category for the property he wants to edit, then the number of properties that they have to search is reduced to only those in the category; and a second view that is arranged alphabetically by property name, allowing the user to search visually if he knows the name of the property.

There are several issues with this approach. First, the user can only effectively search the categorized view if he knows how to categorize the property for which he is looking in the same way that the creators of the categorization did. For this reason most users tend to use a property grid in the alphabetically sorted view. But in the alphabetically sorted view the user must first know the name of the property and then visually search a long list of entries to find the property for which they are looking. This adds overhead or cognitive load to every operation the user wishes to perform in the property grid.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

To solve the problems described herein above, the present examples provide search-based filtering of a property grid. Such filtering allows the user to enter a search term into an easily recognized search text box or apply a user or predefined term to a property grid, thus reducing the set of properties visible so that the user has a smaller list to search to find the one on which they desire to operate. The search term is typically applied to all properties shown in the property grid. Elements that match the search term are made visible in an updated property grid while those that do not match are not presented. Also, the search term may be applied to more than just the name of the property. It may be applied to a category within which the property appears, the type of the property, or any of a number of attributes or tags that may be applied to the property.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein:

FIG. 1 is block diagram showing an example search-based filter system for property grids typically used in conjunction with a user interface design and development tool or the like.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments.

Figure 1:
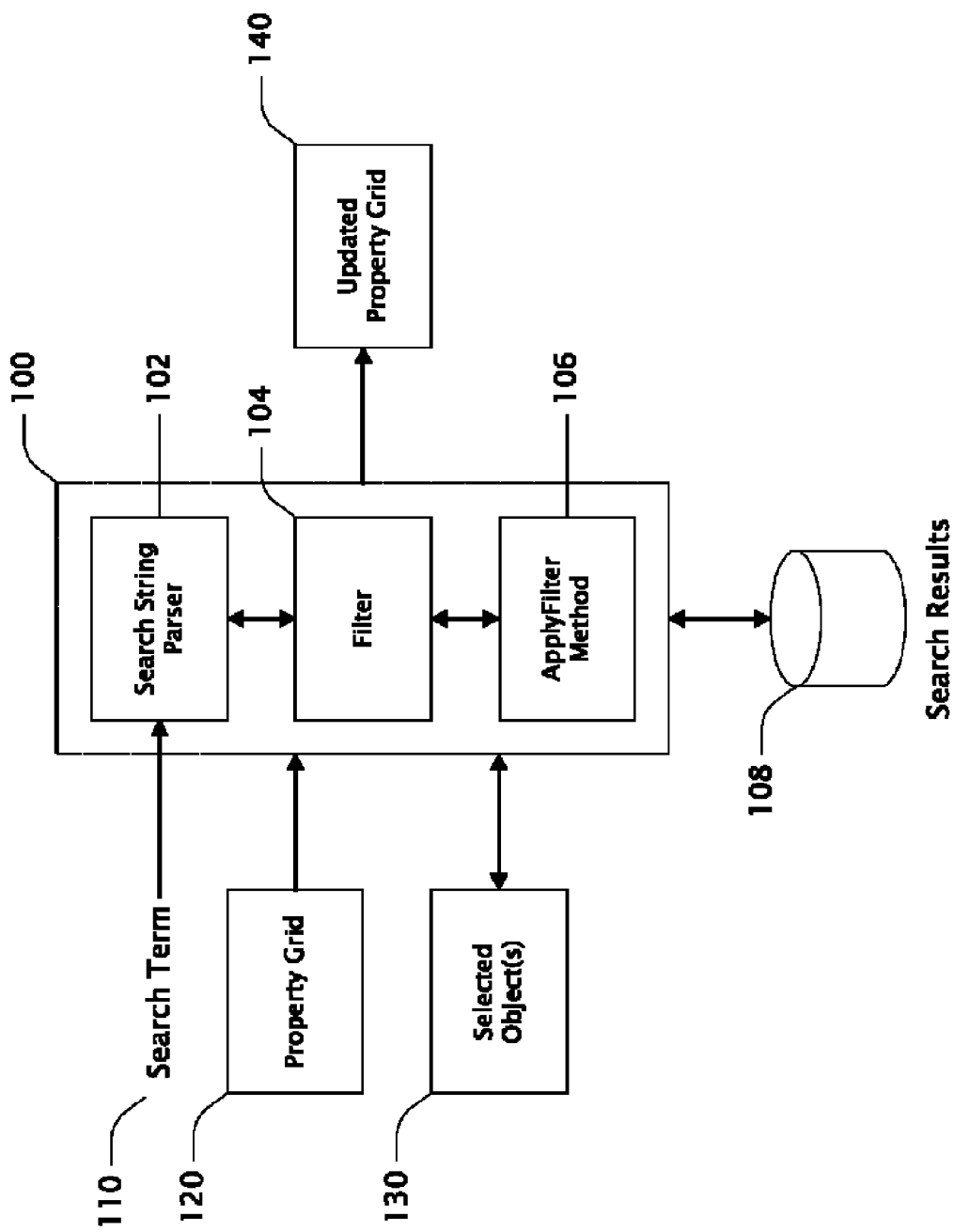

FIG. 1 is block diagram showing an example search-based filter ("SBF") system 100 for property grids typically used in conjunction with a user interface design and development tool or the like. SPF system 100 typically accepts a search term 110 as an input from a user. Such a user may be a person and/or a system or the like and the term 110 may be submitted via any suitable interface, such as a user interface ("UI"), an application programming interface ("API"), or the like. SBF system 100 also typically interacts with a property grid 120. Such a property grid 120 may be considered an input property grid. Once filtering based on search term 110 has taken place, SBF system 100 typically provides an updated property grid 140 based on the results of the filtering. Input property grid 120 typically represents selected objects 130 rather than all objects present in the UI tool.

SBF system 100 typically includes a search string parser ("SSP") 102 that accepts search term 110. Search term 110 may be a single or compound term. For example, a user may filter a property grid using the search term "width". Alternatively, the user may filter based on several terms such as "width height depth". SSP 102 generally parses the search term string provided by the user into filter 104, providing input validation and error checking as is common in the art.

SBF system 100 also typically includes filter 104 that maintains a set of search predicates based on the parses search term string provided by SSP 102. Filter 104 may be applied to an input property grid to search for elements matching the search predicates. For example, given the search term "width", a single search predicate representing the term "width" is maintained by filter 104. Alternatively, for given the search term "width height depth", three search terms are maintained: one for "width", a second for "height" and a third for "depth". Filter 104 generally searches the input property grid 120 for metadata that either match or contain the search predicates. In one example, such metadata may include properties names, categories, and/or types. Additionally or alternatively, other metadata may be used.

In one example, SBF system 100 includes ApplyFilter Method ("AFM") 106. In this example, AFM 106 checks with filter 104 to see if a match exists between the search term 110 and each property of each category that is currently editable. Generally a category is editable if it is currently presented in property grid 120, such as when an associated object is selected in a host UI tool. For each category or property match, the result is stored in search results data store ("SRDS") 108. Upon completion of the matching by AFM 106, SBF system 100 updates the property grid with the results stored in SRDS 108 resulting in updated property grid 140. SRDS 108 may be any suitable data storage mechanism coupled to SBF system 100, and may or may not be an integral component of SBF system 100.

Figure 2:
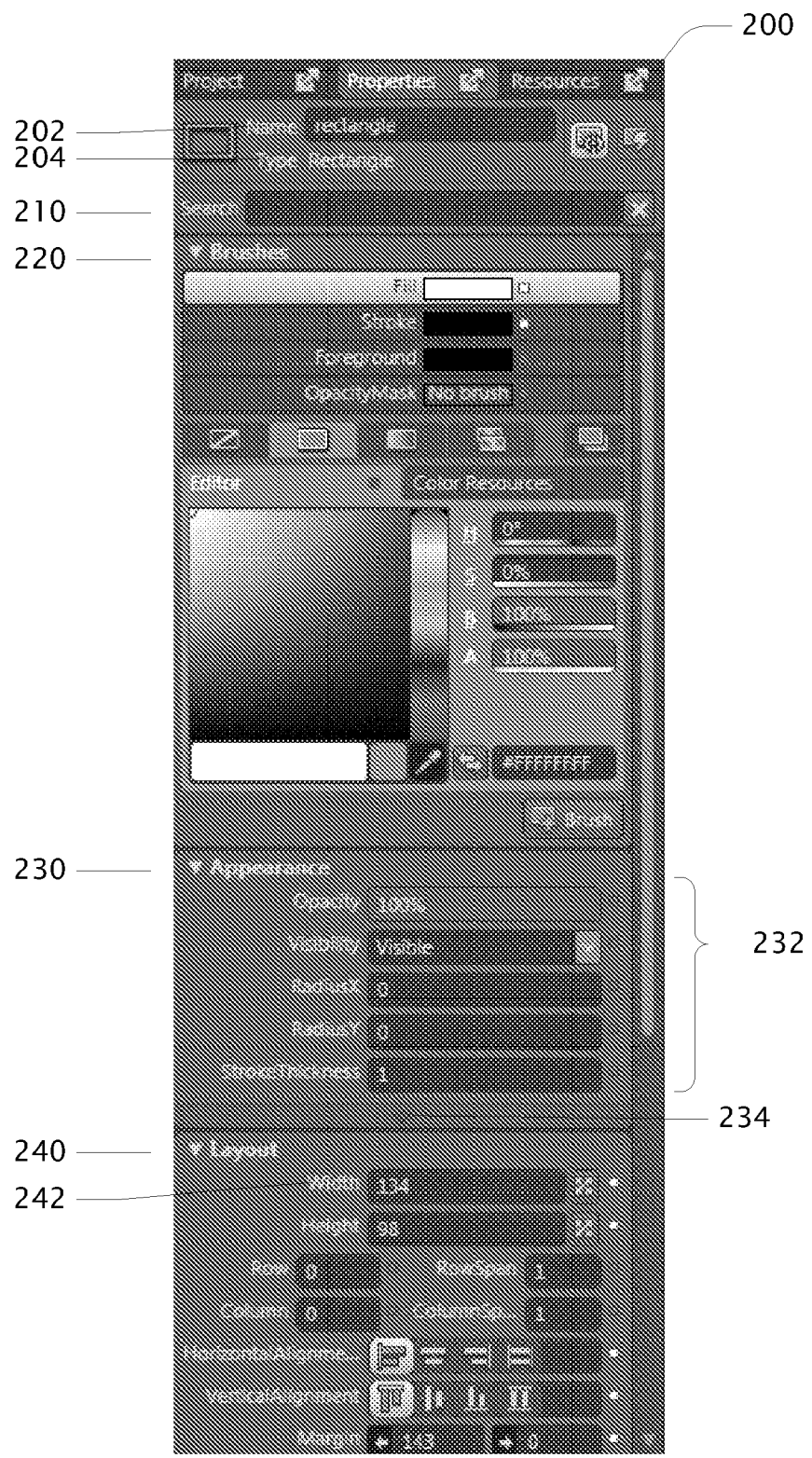
FIG. 2 is a diagram showing an example input property grid such as the input property grid described in connection with FIG. 1.

FIG. 2 is a diagram showing an example input property grid 200 such as the input property grid 120 described in connection with FIG. 1. Example fields 202 and 204 indicate the name and type respectively of the object currently selected for which the properties displayed in property grid 200 apply. Alternative display mechanisms may be employed when multiple objects are selected. Example categories Brushes 220, Appearance 230, and Layout 240 are shown including various property editing tools. For example, Appearance category 230 is shown with common properties 232 and a control 234 operable to display advanced properties when selected by a user. In general, common properties are those properties of the category designated by the object creator or the like to be most commonly accessed by a user. Such common properties are typically displayed by default in a property grid. Alternatively, advanced properties are generally those properties of the category designated less likely to be commonly accessed. Such advanced properties are typically hidden by default, but accessible via a control, such as control 234, of the property grid. As an example, Layout category 240 includes a common property Width 242. Finally, property grid 200 includes a search term field 210 operable to accept a search term such as search term 110 described in connection with FIG. 1.

A property editor is typically some form of edit control used to edit a property value, such as the input field of Width property 242 shown containing the value 134. As used herein, the term property editor generally refers to a UI mechanism operable to display the name or identifier or the like of the property along with a means of editing the property value. Such an editing means may be a simple edit field or input field or the like, or a sophisticated graphical editing mechanism, or any other appropriate editing means.

Figure 3:
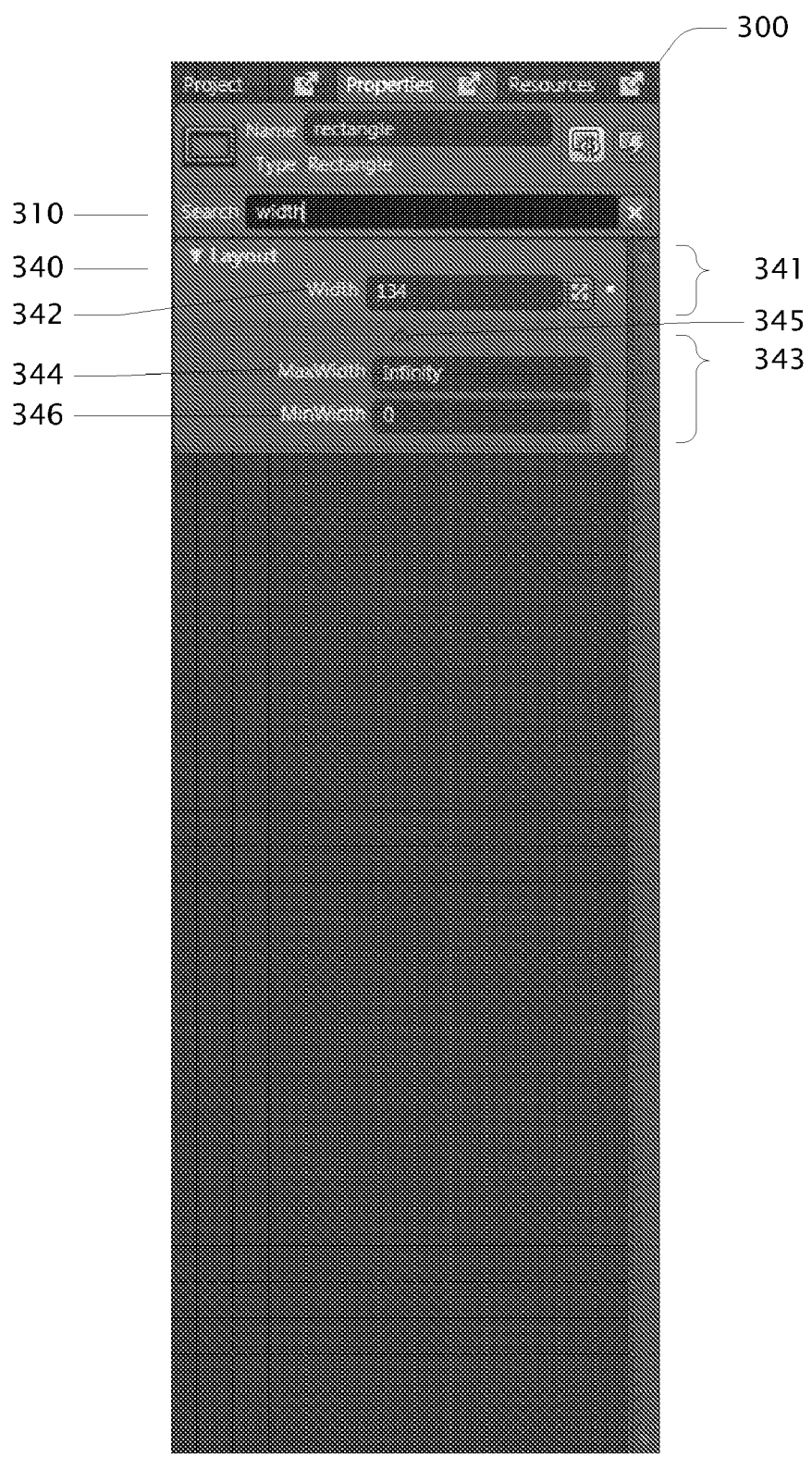
FIG. 3. is a diagram showing an example updated property grid such as the updated property grid described in connection with FIG. 1.

FIG. 3. is a diagram showing an example updated property grid 300 such as the updated property grid 140 described in connection with FIG. 1. Note that the search term "width" has been entered in search term field 310. Based on the entered search term, updated property grid 300 presents to the user only those categories and/or properties that match the search term. For example, given input property grid 200 of FIG. 1, and the search term "width" as shown in search term field 310, updated property grid 300 presents Layout category 340 with matching common property Width 342 and matching advanced properties MaxWidth 344 and MinWidth 346. Note that common property area 341 presents the only matching common property 342 and that advanced property area 343 is automatically presented (as indicated by control 345 and the presence of advanced property area 343) with the only matching advanced properties 344 and 346. For purposes of this example, and not by way of limitation, no other categories or properties match search term 310. In alternative examples, any number of categories and/or properties may match a search term or portion thereof and be presented in an updated property grid.

Figure 4:
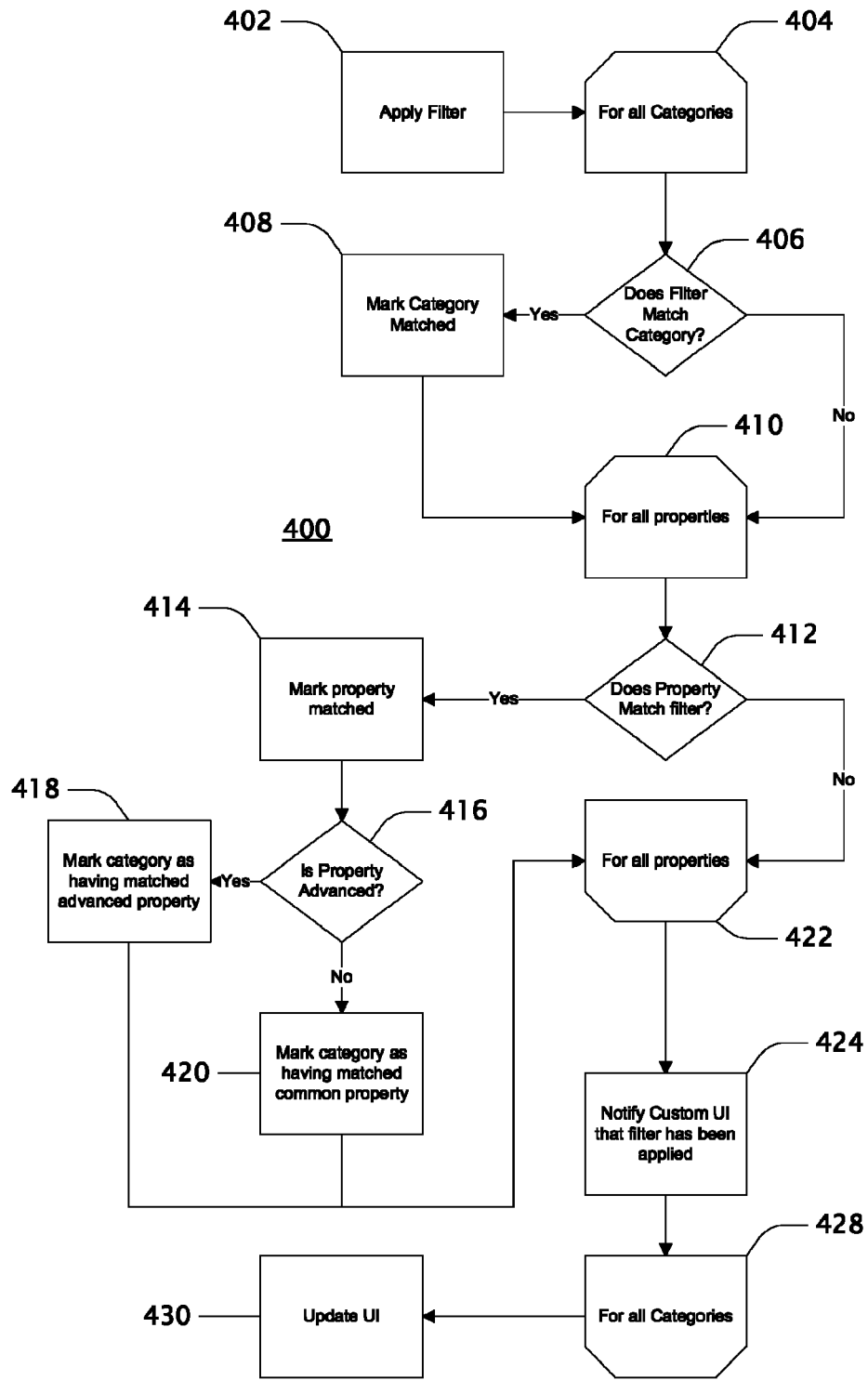
FIG. 4 is a block diagram showing an example method of filtering a property grid based on a search term.

FIG. 4 is a block diagram showing an example method 400 of filtering a property grid based on a search term. In general, a search term is provided, such as search term 110 of FIG. 1, and is parsed into one or more search predicates for use in filtering. Filter is typically applied to categories and properties currently presented in an input property grid, including common and advanced properties even if not currently visible in the property grid. Such currently presented categories and properties are typically those associated with currently selected objects in a host UI tool.

Blocks 402 and 404 typically indicate applying a filter to each category of the input property grid. In one example, the filter iterates over each category associated with the currently selected objects. For each such category, method 400 typically continues at block 406.

Block 406 typically indicates applying the filter to the category to test for a search predicate match. Testing is generally performed for each search predicate. In one example, testing for a match is performed on multiple pieces of metadata associated with the category, including category name and type. Alternatively or additionally, other metadata may be tested. If there is a match, method 400 typically continues at block 408; otherwise method 400 typically continues at block 410.

Block 408 typically indicates marking the matching category. In one example, this includes storing information about the matching category in a data store, such as SRDS 108 of FIG. 1. Once marked, method 400 typically continues at block 410.

Block 410 typically indicates applying a filter to each property of the current category (per block 404; matching or not per block 406) of the input property grid. In one example, the filter iterates over each property associated with the currently selected objects. For each such property, method 400 typically continues at block 412.

Block 412 typically indicates applying the filter to the property to test for a search predicate match. Testing is generally performed for each search predicate. In one example, testing for a match is performed on multiple pieces of metadata associated with the property, including property name, category, and type. Alternatively or additionally, other metadata may be tested. In one example, if a search predicate is located in a tested piece of metadata, the property is considered matching. For example, the advanced property name "MaxWidth" 344 is considered a match to the search predicate "width". Note that case may be ignored. If there is a match, method 400 typically continues at block 414; otherwise method 400 typically continues at block 422.

Block 414 typically indicates marking the matching property. In one example, this includes storing information about the matching property in a data store, such as SRDS 108 of FIG. 1. Once marked, method 400 typically continues at block 416.

Block 416 typically indicates determining is the matching property is an advanced property. If the property is advanced, then method 400 typically continues at block 418; otherwise the matching property is a common property and method 400 typically continues at block 420.

Block 418 typically indicates marking the category associated with the advanced property as including a matching advanced property. In one example, this includes storing information about the category and matching advanced property in a data store, such as SRDS 108 of FIG. 1. Once marked, method 400 typically continues at block 422.

Block 422 typically indicates marking the category associated with the common property as including a matching advanced property. In one example, this includes storing information about the category and matching advanced property in a data store, such as SRDS 108 of FIG. 1. Once marked, method 400 typically continues at block 422.

Block 422 typically indicates iterating through all properties of the current category (per block 404). For the next property, iteration typically continues at block 410. Once all properties have been iterated, method 400 typically continues at block 424.

Block 424 typically indicates notifying any custom property editors associated with the current category of any related category and/or property matches. Such a notification may be used by a custom editor to appropriately configure UI attributes such as tabs containing matching properties, etc. Such notifications are generally provided by the present invention. Such configuration is generally a function of the editor and not of the present invention. A custom property editor is generally an editor not native to a property grid. Once appropriate notifications have been provided, method 400 typically continues at block 428.

Block 428 typically indicates iterating through all categories of the input property grid. For the next category, iteration typically continues at block 404. Once all categories have been iterated, method 400 typically continues at block 430.

Block 430 typically indicates updating the property grid based on the filtering results. In one example, this includes reading filter results including information about matching categories and properties from a data store such as SRDS 108 of FIG. 1. In general, the updated property grid presents only those categories and/or properties matching the search term. In one example, the property grid will continue to present a filtered view so long as the search term field (i.e., search term field 310 of FIG. 3) includes an input value. Once the search term field is cleared, the property grid reverts back to its original state.

Figure 5:
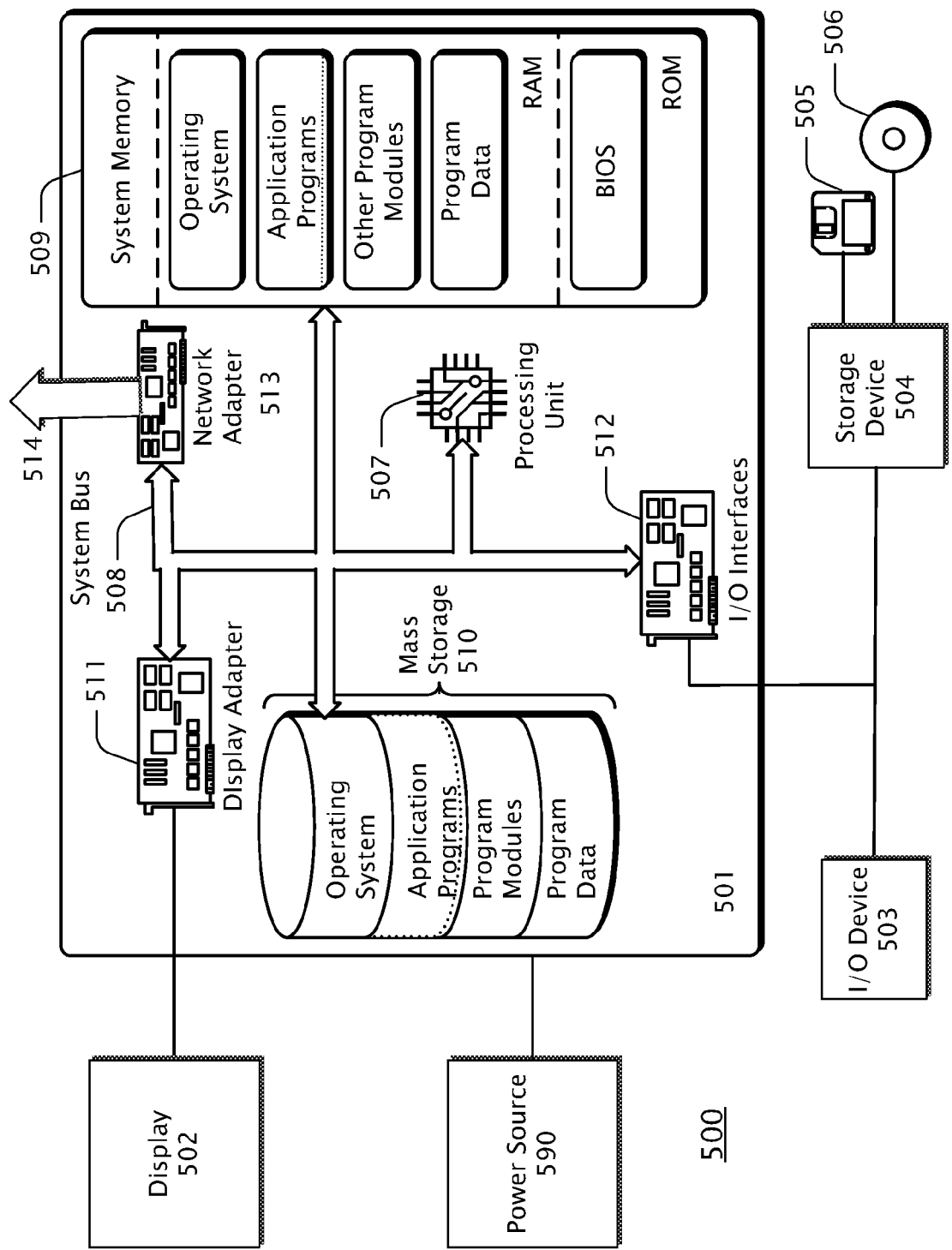
FIG. 5 is a block diagram showing an example computing environment in which the technologies described herein may be implemented.

FIG. 5 is a block diagram showing an example computing environment 500 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 500 typically includes a general-purpose computing system in the form of a computing device 501 coupled to various components, such as peripheral devices 502, 503, 504 and the like. System 500 may couple to various other components, such as input devices 503, including voice recognition, touch pads, buttons, keyboards and/or pointing devices, such as a mouse or trackball, via one or more input/output ("I/O") interfaces 512. The components of computing device 501 may include one or more processors (including central processing units ("CPU"), graphics processing units ("GPU"), microprocessors ("µP"), and the like) 507, system memory 509, and a system bus 508 that typically couples the various components. Processor 507 typically processes or executes various computer-executable instructions to control the operation of computing device 501 and to communicate with other electronic and/or computing devices, systems or environment (not shown) via various communications connections such as a network connection 514 or the like. System bus 508 represents any number of several types of bus structures, including a memory bus or memory controller, a peripheral bus, a serial bus, an accelerated graphics port, a processor or local bus using any of a variety of bus architectures, and the like.

System memory 509 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 509 typically stores data, computer-executable instructions and/or program modules comprising computer-executable instructions that are immediately accessible to and/or presently operated on by one or more of the processors 507.

Mass storage devices 504 and 510 may be coupled to computing device 501 or incorporated into computing device 501 via coupling to the system bus. Such mass storage devices 504 and 510 may include non-volatile RAM, a magnetic disk drive which reads from and/or writes to a removable, non-volatile magnetic disk (e.g., a "floppy disk") 505, and/or an optical disk drive that reads from and/or writes to a non-volatile optical disk such as a CD ROM, DVD ROM 506. Alternatively, a mass storage device, such as hard disk 510, may include non-removable storage medium. Other mass storage devices may include memory cards, memory sticks, tape storage devices, and the like.

Any number of computer programs, files, data structures, and the like may be stored in mass storage 510, other storage devices 504, 505, 506 and system memory 509 (typically limited by available space) including, by way of example and not limitation, operating systems, application programs, data files, directory structures, computer-executable instructions, and the like.

Output components or devices, such as display device 502, may be coupled to computing device 501, typically via an interface such as a display adapter 511. Output device 502 may be a liquid crystal display ("LCD"). Other example output devices may include printers, audio outputs, voice outputs, cathode ray tube ("CRT") displays, tactile devices or other sensory output mechanisms, or the like. Output devices may enable computing device 501 to interact with human operators or other machines, systems, computing environments, or the like. A user may interface with computing environment 500 via any number of different I/O devices 503 such as a touch pad, buttons, keyboard, mouse, joystick, game pad, data port, and the like. These and other I/O devices may be coupled to processor 507 via I/O interfaces 512 which may be coupled to system bus 508, and/or may be coupled by other interfaces and bus structures, such as a parallel port, game port, universal serial bus ("USB"), fire wire, infrared ("IR") port, and the like.

Computing device 501 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 501 may be coupled to a network via network adapter 513 or the like, or, alternatively, via a modem, digital subscriber line ("DSL") link, integrated services digital network ("ISDN") link, Internet link, wireless link, or the like.

Communications connection 514, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 590, such as a battery or a power supply, typically provides power for portions or all of computing environment 500. In the case of the computing environment 500 being a mobile device or portable device or the like, power source 590 may be a battery. Alternatively, in the case computing environment 500 is a desktop computer or server or the like, power source 590 may be a power supply designed to connect to an alternating current ("AC") source, such as via a wall outlet.

Some mobile devices may not include many of the components described in connection with FIG. 5. For example, an electronic badge may be comprised of a coil of wire along with a simple processing unit 507 or the like, the coil configured to act as power source 590 when in proximity to a card reader device or the like. Such a coil may also be configure to act as an antenna coupled to the processing unit 507 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 502, I/O device 503, or many of the other components described in connection with FIG. 5. Other mobile devices that may not include many of the components described in connection with FIG. 5, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A property grid filtering system for updating a property grid based on a search term, the system comprising:
    a search string parser configured to parse the search term into one or more search predicates, wherein the search term is provided to the system in a search term field;
    a filter configured to maintain the one or more search predicates derived from the parsed search term;
    an ApplyFilter method configured to apply the filter to each category of a plurality of categories of the property grid and each property of a plurality of properties of the property grid, wherein each of the plurality of properties is associated with at least one of the plurality of categories, and wherein applying the filter includes testing each category of the plurality of categories to determine that category metadata of the each category matches at least one of the one or more search predicates and marking each matching category, and wherein the category metadata includes a name of the each category and a type of the each category, and wherein the applying further includes testing each property of the plurality of properties to determine that property metadata of the each property matches at least one of the one or more search predicates and marking each matching property, and wherein the property metadata includes a name of the each property and a type of the each property and a category of the each property;
    wherein the property grid filtering system is configured to update the property grid to include, of the plurality of categories, only the marked categories, and to include, of the plurality of properties, only the marked properties;
    wherein the property grid filtering system is configured to display the updated property grid including the marked categories and the marked properties in response to the search term being present in the search term field, and to display the property grid including the plurality of categories and the plurality of properties instead of the updated property grid including the marked categories and the marked properties in response to the search term being cleared from the search term field; and
    a computing device configured to perform at least the ApplyFilter method.

2. The system of claim 1 further comprising a data store configured to store information identifying the categories and properties marked as a result of applying the filter.

3. The system of claim 1 wherein the property grid corresponds to one or more selected objects of a host tool.

4. The system of claim 1 wherein the property grid filtering system is further configured to notify a custom property editor associated with the property grid.

5. The system of claim 1 wherein the property grid includes common properties and advanced properties wherein common properties are displayed in the property grid by default, and wherein advanced properties are hidden in the property grid by default.

6. A method of generating an updated property grid based on a search term, the method comprising:
parsing the search term into one or more search predicates, the search term provided in a search term field;
applying a filter to a category of a plurality of categories of a property grid, wherein the applying the filter to the category includes testing the category to determine that category metadata of the category matches at least one of the one or more search predicates and marking the category, and wherein the category metadata includes a name of the category and a type of the category;
updating the property grid, based at least on the applying the filter, to include, of the plurality of categories, only the marked category;
displaying the updated property grid including the marked category in response to the search term being present in the search term field;
displaying the property grid including the plurality of categories instead of the updated property grid and the marked category in response to the search term being cleared from the search term field;
wherein the method being performed by a computing device.

7. The method of claim 6 further comprising:
applying the filter to a property of a plurality of properties, wherein the property is associated with the category, wherein the applying the filter to the property includes testing the property to determine that property metadata of property matches at least one of the one or more search predicates and marking the property, and wherein the property metadata includes a name of the property and a type of the property and the a category of the property; and
displaying the updated property grid including the marked category and the marked property in response to the search term being present in the search term field; and
displaying the property grid including the plurality of categories and the plurality of properties instead of the updated property grid including the marked category and the marked property in response to the search term being cleared from the search term field.

8. The method of claim 7 wherein the property grid corresponds to one or more selected objects of a host tool.

9. The method of claim 6 further comprising notifying a custom property editor associated with the property grid that the filter has been applied.

10. A computer-readable storage medium including computer-executable instructions that, when executed by a computer, cause the computer to perform a method for presenting an updated property grid based on a search term, the method comprising:
parsing the search term into one or more search predicates, the search term provided in a search term field;
applying a filter to a category of a plurality of categories of a property grid wherein the applying the filter includes testing the category to determine that category metadata of the category matches at least one of the one or more search predicates and marking the category, and wherein the category metadata includes a name of the category and a type of the category;
applying the filter to a property of a plurality of properties, wherein the property is associated with the category, and wherein the applying includes testing the property to determine that property metadata of the property matches at least one of the one or more search predicates and marking the property, and wherein the property metadata includes a name of the property and a type of the property and the category of the property; and
updating the property grid to include, of the plurality of categories, only the marked category, and to include, of the plurality of properties, only the marked property;
displaying the updated property grid including the marked category and the marked property in response to the search term being present in the search term field;
displaying the property grid including the plurality of categories and the plurality of properties instead of the updated property grid and the marked category and the marked property in response to the search term being cleared from the search term field.

11. The computer-readable storage medium of claim 10 the method further comprising notifying a custom property editor associated with the property grid.

12. The computer-readable storage medium of claim 10 wherein the property grid corresponds to one or more selected objects of a host tool.

* * * * *